(12) United States Patent
Kim et al.

(10) Patent No.: US 11,699,017 B2
(45) Date of Patent: Jul. 11, 2023

(54) DIE YIELD ASSESSMENT BASED ON PATTERN-FAILURE RATE SIMULATION

(71) Applicant: Siemens Industry Software Inc., Plano, TX (US)

(72) Inventors: Young Chang Kim, San Jose, CA (US); John L. Sturtevant, Portland, OR (US); Andrew Burbine, Rochester, NY (US); Christopher Clifford, Alameda, CA (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 17/417,223

(22) PCT Filed: Aug. 23, 2019

(86) PCT No.: PCT/US2019/047839
§ 371 (c)(1),
(2) Date: Jun. 22, 2021

(87) PCT Pub. No.: WO2020/162979
PCT Pub. Date: Aug. 13, 2020

(65) Prior Publication Data
US 2022/0075274 A1     Mar. 10, 2022

Related U.S. Application Data (60) Provisional application No. 62/803,090, filed on Feb. 8, 2019.

(51) Int. Cl.
G06F 30/30     (2020.01)
G03F 7/20      (2006.01)
(Continued)

(52) U.S. Cl.
CPC .............. *G06F 30/398* (2020.01); *G03F 1/36* (2013.01); *G03F 7/705* (2013.01);
(Continued)

(58) Field of Classification Search
None
See application file for complete search history.

(56) References Cited

U.S. PATENT DOCUMENTS 7,941,768 B1 * 5/2011 Wei ........................ G03F 7/705
716/54
8,856,698 B1   10/2014 Latypov
(Continued)

OTHER PUBLICATIONS

E. W. Charrier et al., "Yield Modeling and Enhancement for Optical Lithography," Proc. SPIE 2440, Optical/Laser Microlithography VIII, May 26, 1995, pp. 435-447. (Year: 1995).*
(Continued)

*Primary Examiner* — Leigh M Garbowski (57) ABSTRACT

This application discloses a computing system to identify structures of an integrated circuit capable of being fabricated utilizing a lithographic mask described by mask layout data and to generate process windows for the identified structures based, at least in part, on the mask layout data and a failure definition for the identified structures. The computing system utilizes process windows for the identified structures to determine failure rates for the identified structures based on a distribution of the manufacturing parameters. The computing system determines frequency of occurrences for the identified structures from the mask layout data and generates a die yield metric for the integrated circuit by aggregating the failure rates for the identified structures based on the frequency of occurrences for the identified structures in the integrated circuit. These increases in yield of the integrated circuit allow manufacturers to produce more units per fixed processing cost of the wafer.

17 Claims, 6 Drawing Sheets

(51) Int. Cl.
*G06F 30/398* (2020.01)
*G03F 7/00* (2006.01)
*G03F 1/36* (2012.01)
*G06F 119/18* (2020.01)
*G06F 119/22* (2020.01)

(52) U.S. Cl.
CPC ...... *G03F 7/70441* (2013.01); *G06F 2119/18* (2020.01); *G06F 2119/22* (2020.01)

(56) References Cited

U.S. PATENT DOCUMENTS

| | | | | |
|---|---|---|---|---|
| 9,064,087 | B2* | 6/2015 | Bickford | G06F 30/20 |
| 9,639,645 | B2* | 5/2017 | Bickford | G06F 30/398 |
| 10,539,611 | B2* | 1/2020 | Bickford | G05B 19/418 |
| 11,079,687 | B2* | 8/2021 | Slachter | G03F 7/70641 |
| 11,354,484 | B2* | 6/2022 | Hansen | G06F 30/392 |
| 2009/0157360 | A1* | 6/2009 | Ye | G06F 30/20 703/2 |
| 2010/0122225 | A1* | 5/2010 | Cao | G06F 30/20 716/136 |
| 2016/0019328 | A1* | 1/2016 | Bickford | G06F 30/367 703/14 |
| 2021/0397172 | A1* | 12/2021 | Slachter | G05B 19/4183 |

OTHER PUBLICATIONS

P. De Bisschop, "Stochastic printing failures in extreme ultraviolet lithography," J. Micro/Nanolith. MEMS MOEMS, vol. 17, No. 4, Oct.-Dec. 2018, 24 pages. (Year: 2018).*

PCT International Search Report and Written Opinion of International Searching Authority dated Dec. 2, 2019 corresponding to PCT International Application No. PCT/US2019/047839 filed Aug. 23, 2019.

Yeh, Shin-Shing et al: "Study of the Pattern Aware OPC", Visual Communications and Image Processing; Jan. 20, 2004, Mar. 31, 2014, pp. 90521Y1-90521Y9, vol. 9052, San Jose, CA.

Chris A. Mack: "Focus effects in submicron optical lithography, part 4: metrics for depth of focus (Oral Standby)", Proceedings of Spie, vol. 2440, May 26, 1995, pp. 458-471, Santa Clara, CA, US.

Charles Chiang: "Design for Manufacturability and Yield for Nano-Scale CMOS", ProQuest Ebook Central, Jan. 1, 2007, pp. 195-226, Retrieved from the Internet: URL:http://ebookcentral .proquest. comilibie po-eboolcsidetail.action?docID=371665 [retrieved on Oct. 23, 2019].

Shoji Mimotogi: "Statistical Method for Influence of Exposure and Focus Error on CD Variation", Visual Communications and Image Processing; Jan. 20, 2004; San Jose, vol. 4346, Sep. 1, 2001, pp. 303-308.

Mack, Chris A.: "Lithography Simulation in Semiconductor Manufacturing", Proceedings of SPIE, Jan. 27, 2005, pp. 63-83.

Gary S. May: "Fundamentals of Semiconductor Manufacturing and Process Control" In: "Fundamentals of Semiconductor Manufacturing and Process Control", Jan. 1, 2006, Wiley & Sons, pp. 147-180.

Bourov, Anatoly et al. "Lithographic process window analysis by statistical means," Proc. SPIE, Metrology Inspection, and Process Control for Microlithgrahy XVI, Jul. 16, 2002., pp. 484-491.

Kumar, N. et al.: "A review of yield modelling techniques for semiconductor manufacturing", International Journal of Production Research.,vol. 44, No. 23, Dec. 1, 2006 (Dec. 1, 2006), pp. 5019-5036, XP055722655, GBISSN: 0020-7543, DOI: 10.1080/00207540600596874.

* cited by examiner

EXAMPLE TARGET WAFER IMAGE 410

STRUCTURE 411

LITHOGRAPHIC RESPONSE 420

LINE WIDTH 421

FOCUS 422

DOSE 431

PROCESS WINDOW 430

FOCUS 432

DIE YIELD ASSESSMENT BASED ON PATTERN-FAILURE RATE SIMULATION

RELATED APPLICATION

This patent application is a National Stage of International Application No. PCT/US2019/047839, filed Aug. 23, 2019, which claims priority to U.S. Provisional Patent Application No. 62/803,090, filed Feb. 8, 2019, which are incorporated by reference herein.

TECHNICAL FIELD

This application is generally related to electronic design automation and, more specifically, to die yield assessment based on pattern-failure rate simulation.

BACKGROUND

In a design flow for fabricating integrated circuits, a physical design of an integrated circuit can describe specific geometric elements, often referred to as a "layout" design. The geometric elements, which typically are polygons, define the shapes that will be created in various materials to manufacture the integrated circuit. Typically, a designer will select groups of geometric elements representing circuit device components, e.g., contacts, gates, etc., and place them in a design area. These groups of geometric elements may be custom designed, selected from a library of previously-created designs, or some combination of both. Once the groups of geometric elements representing circuit device components have been placed, geometric elements representing connection lines then are then placed between these geometric elements according to the predetermined route. These lines will form the wiring used to interconnect the electronic devices.

Circuit layout descriptions can be provided in many different formats. The Graphic Data System II (GDSII) format is a popular format for transferring and archiving two-dimensional (2D) graphical circuit layout data. Among other features, it contains a hierarchy of structures, each structure containing layout elements (e.g., polygons, paths or poly-lines, circles and textboxes). Other formats include an open source format named Open Access, Milkyway, EDDM, and Open Artwork System Interchange Standard (OASIS). These various industry formats are used to define the geometrical information in layout designs that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask must be created to expose only the desired areas to the radiation, and to protect the other areas from exposure. The mask is created from circuit layout data. That is, the geometric elements described in a layout design define the relative locations or areas of the circuit that will be exposed to radiation through the mask. A mask or reticle writing tool is used to create the mask based upon the layout design, after which the mask can be used in a photolithographic process.

As designers and manufacturers continue to increase the number of circuit components in a given area and/or shrink the size of circuit components, the shapes reproduced on the substrate (and thus the shapes in the mask) become smaller and are placed closer together. This reduction in feature size increases the difficulty of faithfully reproducing the image intended by the layout design onto the substrate. The diffractive effects of light often result in defects where the intended image is not accurately "printed" onto the substrate during the photolithographic process, creating flaws in the manufactured device. One or more resolution enhancement techniques (RETs) are often employed to improve the resolution of the image that the mask forms on the substrate during the photolithographic process.

One of these techniques, "optical proximity correction" or "optical process correction" (OPC), adjusts the amplitude of the light transmitted through a lithographic mask by modifying the mask layout design data employed to create the mask. For example, edges in the mask layout design may be adjusted to make certain portions of the geometric elements larger or smaller, in accordance with how much additional light exposure (or lack of exposure) is desired at certain points on the substrate. When these adjustments are appropriately calibrated, overall pattern fidelity can be improved.

During manufacturing, a semiconductor manufacturer can utilize lithographic masks created based on the mask layout design data to fabricate the integrated circuit. The manufacturing processes used by the semiconductor manufacturer, however, can have parameters that vary during fabrication of the integrated circuit, such as an exposure dose and a focus depth of the light transmitted through the lithographic masks, which can alter a size and/or shape of some integrated circuit structures. In some instances, these alterations of size and/or shape can lead to a defect in the integrated circuit, for example, when the structure exceeds an error tolerance for a critical dimension in the integrated circuit.

To address these manufacturing variability-based defects, the designers and manufacturers use intuition or experience to identify structures that may have a lithographic response to variations of dose and focus that could induce a defect. The identified structures could then be tested empirically, for example, repeatedly fabricating the identified structures with different combinations of dose and focus and measuring the dimensions of the resulting structures. These empirical tests could identify which combinations of dose and focus would likely allow for the structures to be fabricated without defects.

As the reduction in feature size has increased, the number of structures affected by the manufacturing variability has also increased, which rendered performing empirical tests for the increased number of structures impractical. Many designers and manufacturers instead have turned to verification of the lithographic mask design data generated by optical proximity correction tool by utilizing simulation to identify a reduced set of problematic structures or hotspots in the integrated circuit to perform the empirical testing.

The designers and manufacturer typically use the results of the empirical testing to subjectively determine whether a defect risk for a structure was sufficiently low to proceed with fabrication of the integrated circuit or whether to perform a redesign of the structure. Several designers and manufacturers have attempted to quantify the defect risk, for example, by performing Monte Carlo simulations with various combinations of dose and focus, but it was a time-consuming and resource intensive process given the number of Monte Carlo simulations performed per structure and the number of structures to analyze in the integrated circuit.

SUMMARY

This application discloses a computing system to identify structures of an integrated circuit capable of being fabricated utilizing a lithographic mask described by mask layout data and to generate process windows for the identified structures based, at least in part, on the mask layout data and a failure definition for the identified structures. The computing system can utilize process windows for the identified structures to determine failure rates for the identified structures based on a distribution of the manufacturing parameters. The computing system can determine frequency of occurrences for the identified structures from the mask layout data and generate a die yield metric for the integrated circuit by aggregating the failure rates for the identified structures based on the frequency of occurrences for the identified structures in the integrated circuit. Embodiments will be described below in greater detail.

DETAILED DESCRIPTION

Figure 1:
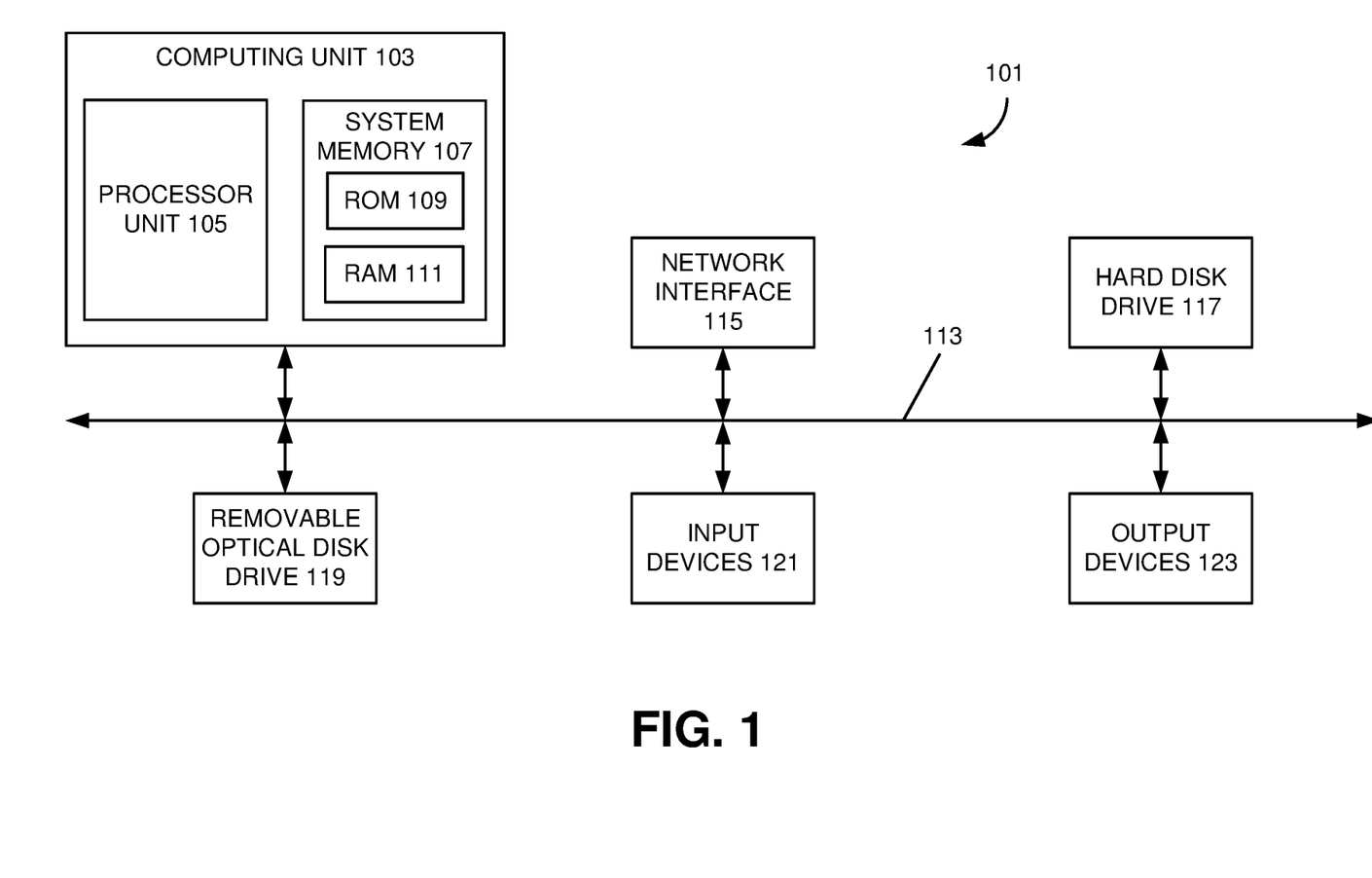
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
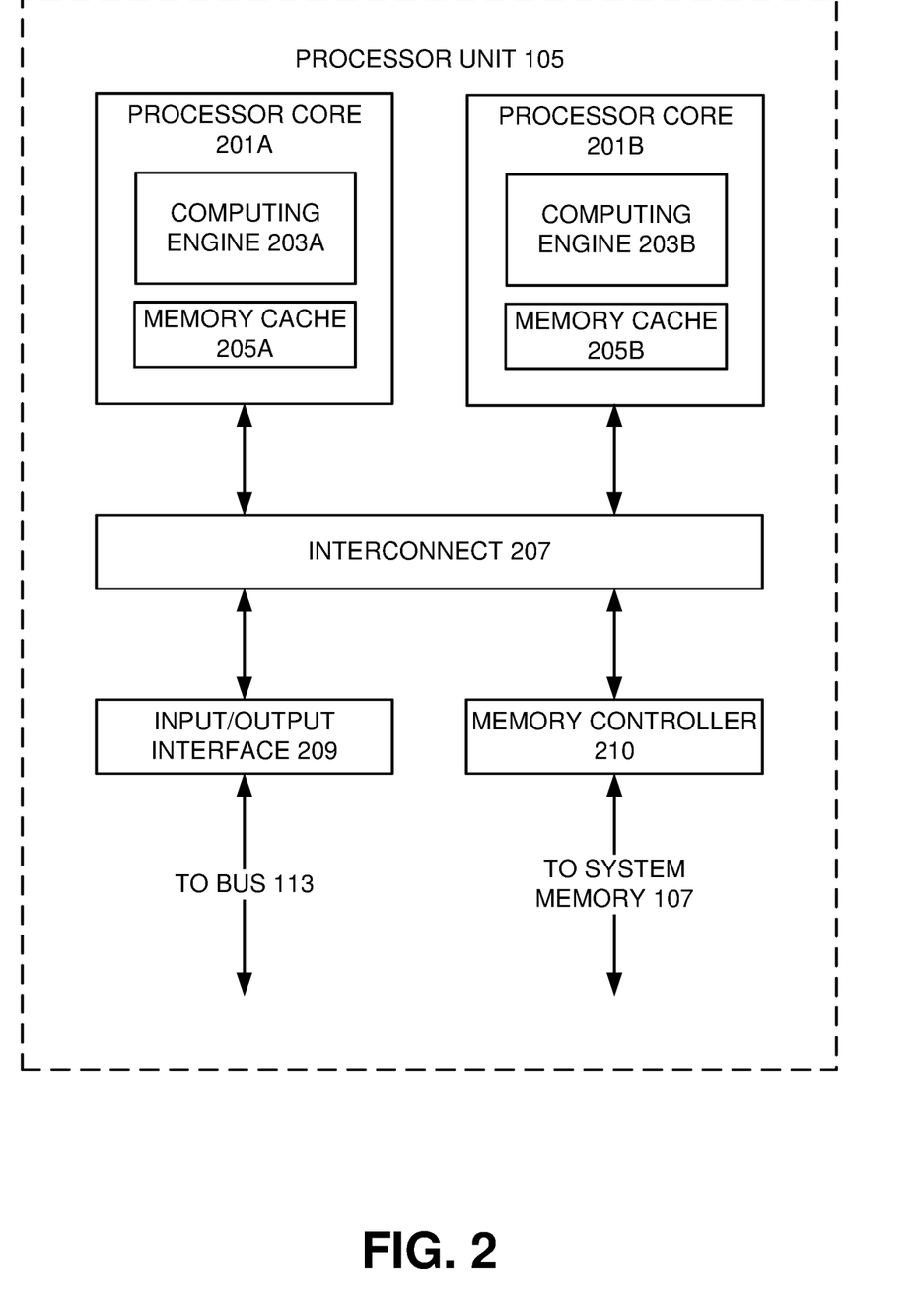

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Die Yield Assessment Based on Pattern-Failure Rate Simulation

Figure 3:
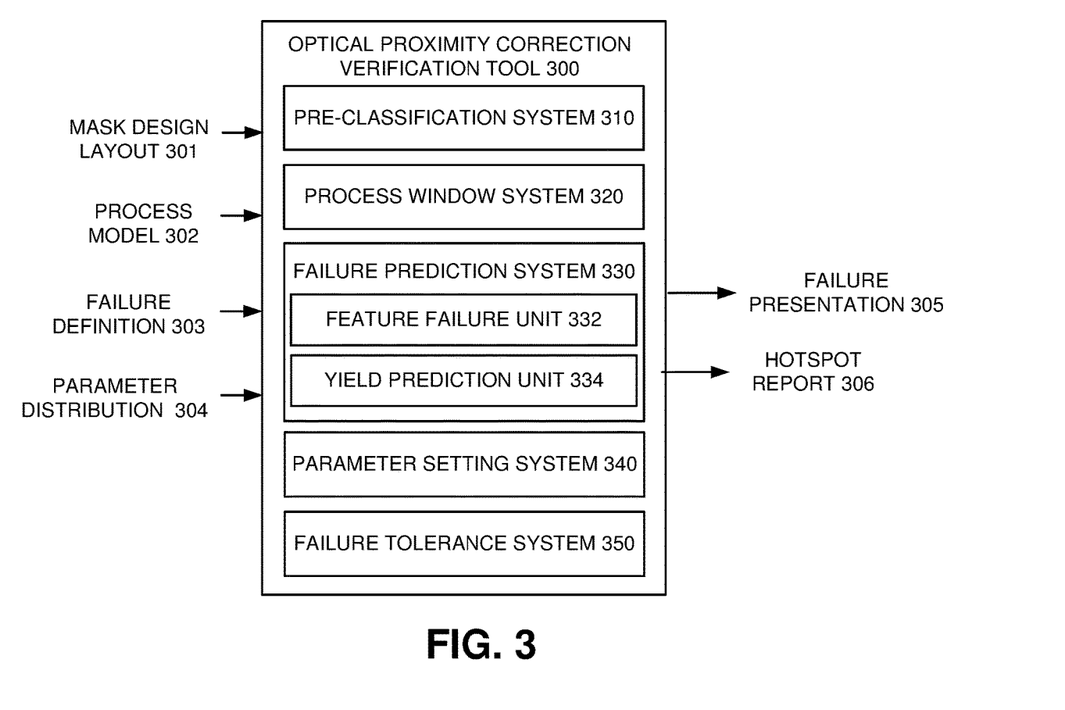
FIG. 3 illustrates an example of an optical proximity correction (OPC) verification tool implementing a die yield assessment according to various embodiments.

FIG. 3 illustrates an example of an optical proximity correction (OPC) verification tool 300 implementing a die yield assessment according to various embodiments. Referring to FIG. 3, the OPC verification tool 300 can receive a mask design layout 301 describing a lithographic mask having a pattern that allows portions of a material layer to be exposed to light during a photolithographic process for a fabrication of an integrated circuit. The lithographic mask can be generated from mask design layout 301, for example, with a reticle writing tool, which can enable fabrication of a target wafer image corresponding to a layout design of the integrated circuit. The layout design can define geometrical information capable of being utilized to manufacture the integrated circuit, which can be specified in a Graphic Data System II (GDSII) format, an Open Access format, a Milkyway format, an EDDM format, an Open Artwork System Interchange Standard (OASIS) format, or the like. In some embodiments, the mask design layout 301 could have undergone optical proximity correction, which can adjust the mask design layout 301 to alter an amplitude of light transmitted through a mask generated by the mask design layout 301 and increase overall pattern fidelity printed on the integrated circuit.

The OPC verification tool 300 can receive a process model 302 that can describe the manufacturing process performed by a semiconductor manufacturer to fabricate the integrated circuit corresponding to the circuit design layout. The process model 302 can identify a critical dimension (CD) for the manufacturing process and types of operations performed to fabricate the integrated circuit. The process model 302 also can identify foundry values for manufacturing parameters, such as a focus of the light during a photolithographic process, an exposure dose or time period of the light exposure, or the like.

The OPC verification tool 300 can receive a failure definition 303 describing manufacturing variability resulting in a failure of portions of the integrated circuit. The failure definition 303 can identify an error tolerance for fabricated structures or features compared to a critical dimension, for example, the error tolerance can be expressed as plus or minus of a percentage of the critical dimension. When a structure or feature would be fabricated with dimensions that fall outside of the critical dimension with the error tolerance, the fabricated structure or feature can be considered to have failed. In some embodiments, the failure definition 303 can identify conditions, such as a pinch condition, a bridge condition, or the like, that would also constitute a failure. The failure definition 303 also may include a target wafer image corresponding to the circuit design layout of the integrated circuit.

The OPC verification tool 300 can receive a parameter distribution 304 to identify which manufacturing parameters could vary during fabrication of the integrated circuit, such as a focus of the light during a photolithographic process, an exposure dose or time period of the light exposure, a critical dimension mask error, stochastic effects, or the like. The parameter distribution 304 also can identify a type of distribution of the manufacturing parameters during fabrication, and define how the manufacturing parameters may vary in that distribution. For example, when the manufacturing parameters vary according to a Gaussian distribution, the parameter distribution 304 can include a mean and standard deviation for each of the manufacturing parameters.

The OPC verification tool 300 can include a pre-classification system 310 to identify patterns in the mask layout data 301 that, due to the variance of the manufacturing parameters during fabrication, have an increased risk of forming failing structures in an integrated circuit. These identified patterns in the mask layout data 301 can correspond to candidate "hotspots" to investigate. In some embodiments, the pre-classification system 310 can simulate the fabrication of the integrated circuit based on the mask layout data 301 to identify which of the patterns in the mask layout data 301 correspond to the hotspots. For example, the pre-classification system 310 can compare the simulated integrated circuit against the target wafer image, and identify deviations of the simulated integrated circuit from the target wafer image based on the comparison. When the deviation between the simulated integrated circuit and the target wafer image exceeds a predetermine threshold, the pre-classification system 310 can identify a portion of the simulated integrated circuit and mask design layout 301 corresponding to the deviation as a hotspot. The pre-classification system 310 also can perform pattern-matching operations on the mask layout data 301 to identify candidate hotspots based on previously known hotspot patterns.

The OPC verification tool 300 can include a process window system 320 to generate a process window for one or more of the patterns identified as corresponding to a hotspot in the mask design layout 301 based, at least in part, on the failure definition 303. A process window can correspond to ranges of values for manufacturing parameters that would allow the semiconductor manufacturer to fabricate non-failing structures with the pattern. In some embodiments, the process window system 320 can simulate fabrication of structures associated with hotspots identified from the mask design layout 301, for example, utilizing different values of the manufacturing parameters. The process window system 320 can identify those values of the manufacturing parameters that did not result in a structure failing based on the failure definition 303. For example, when the failure definition 303 specifies an error tolerance of +/−10% from a 90 nm critical dimension, the process window system 320 can identify values of the manufacturing parameters that were used to simulate structures having widths between 81 nm and 99 nm. Embodiments of the process window generation will be described below with reference to FIG. 4.

Figure 4:
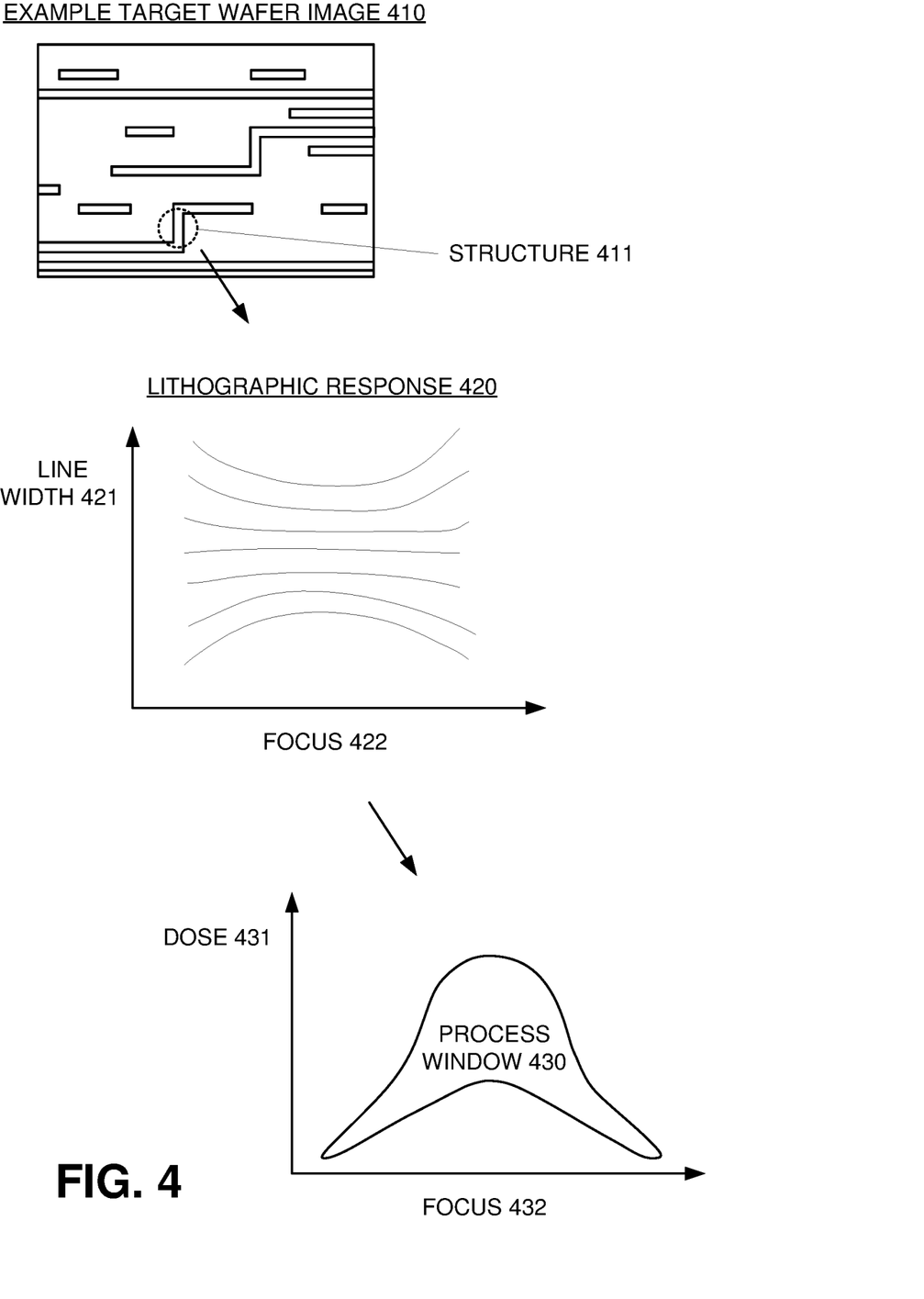
FIG. 4 illustrates an example target wafer image and a corresponding process window for an integrated circuit structure in the target wafer image according to various embodiments.

FIG. 4 illustrates an example target wafer image 410 and a corresponding process window 430 for an integrated circuit structure according to various embodiments. Referring to FIG. 4, the target wafer image 410 can correspond to structures to be fabricated during a photolithographic process from at least one lithographic mask, such as structure 411. The photolithographic process can include exposing light in patterns defined by the lithographic mask to layer materials disposed on a substrate to form the structures of the integrated circuit. Since manufacturing variability exists in this photolithography process, for example, variations in the focus of the light exposure and/or the dose of the light exposure, the structures fabricated on the substrate can differ from the target wafer image 410.

In this example, the structure 411 can be characterized for different combinations of manufacturing parameters, such as dose and focus, to determine a lithographic response 420 to potential manufacturing variability. The lithographic response 420 can be represented as a set of curves in a graph, such as Bossung curves, having an x-axis corresponding to changes in focus 422 and the y-axis corresponding to resulting line width 421 changes for the structure 411. Each of the curves can correspond to a different dose provided during the characterization process. In some embodiments, the lithographic response 420 can be determined via simulation using design data for the lithographic mask to be used to fabricate the target wafer image 410.

The lithographic response 420 to various combinations of dose and focus 422 can be utilized to generate a process window 430 for the structure 411. The process window 430 can correspond to combinations of dose 431 and focus 432 that would allow the structure 411 to be fabricated having a range of line widths considered to be non-defective. In some embodiments, the integrated circuit can have a critical dimension (CD) that corresponds to an idealized width of its structures and have an acceptable error tolerance to identify the range of line widths around the critical dimension that would a fabricated structure to remain non-defective. The process window 430 can correspond to combinations of dose and focus from the lithographic response 420 that would fabricate the structure 411 to have a line width within the acceptable error tolerance of the critical dimension.

Referring back to FIG. 3, the OPC verification tool 300 can include a failure prediction system 330 to generate a failure presentation 305 having one or more failure metrics and/or die yield metrics associated with the mask design layout 301. The failure prediction system 330 can determine a failure rate on a per structure or per feature basis and then utilize the feature failure rates to determine an overall chip failure rate or die yield metric, for example, based in part on a frequency of the features or structures in the mask design layout 301. In some embodiments, the failure prediction system 330 can provide the failure rate per feature to the pre-classification system 310, which can allow the pre-classification system 310 to select a subset of the hotspot structures to include in a hotspot report 306. For example, when the failure rate for a feature falls below a preset threshold failure level, the pre-classification system 310 can eliminate the previously identified hotspot from inclusion in the hotspot report 306. Since a semiconductor manufacturer can perform metrology on the hotspot structures included in the failure presentation 305, such as bright field inspection (BFI) metrology, scanning electron microscope (SEM) metrology, or the like, reducing the number of hotspot structures in the failure presentation 305 can allow the semiconductor manufacturer can reduce metrology and overall turn-around time.

The failure prediction system 330 can include a feature failure unit 332 to determine feature failure rates on a per structure basis or a per feature basis based on the process window 503 for the structure or feature and the parameter distribution 304. Embodiments of the feature failure rate will be described below with reference to FIG. 5.

Figure 5:
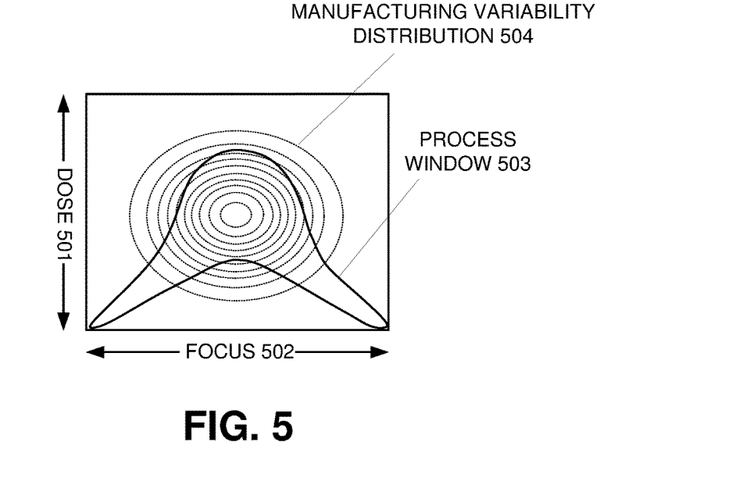
FIG. 5 illustrates an example process window for an integrated circuit structure with a manufacturing variability distribution according to various embodiments.

Referring to FIGS. 3 and 5, the feature failure unit 332 can identify which of the manufacturing parameters could vary during fabrication of the integrated circuit, such as a focus of the light during a photolithographic process, an exposure dose, a critical dimension mask error, stochastic effects, or the like, from the parameter distribution 304. In the example shown in FIG. 5, the manufacturing parameters can be dose 501 and focus 502, and a process window 503 can correspond to combinations of the dose 501 and the focus 502 that would allow a structure or feature to be fabricated having a range of line widths considered to be non-defective based on the failure definition 303.

The feature failure unit 332 can generate a manufacturing variability distribution 504, such as a probability density function, for the manufacturing parameters based on the parameter distribution 304. For example, when the parameter distribution 304 specifies variability for two manufacturing parameters—dose and focus—as Gaussian, the feature failure unit 332 can generate a two-dimensional probability density function having a Gaussian distribution according to the variability described in the parameter distribution 304. In some embodiments, the parameter distribution 304 can include mean or average values and standard deviations for the manufacturing parameters.

The feature failure unit 332 can determine the feature failure rate for a feature in the integrated circuit based on the manufacturing variability distribution 504 and the process window 503 for the feature. In some embodiments, the feature failure unit 332 can determine the feature failure rate utilizing Equation 1:

$$p_{fail} = 1 - \oint_{<process\ window} PDF_{2D}(E, F)dEdF \quad (1)$$

In Equation 1, the probability of a feature failing $p_{fail}$ can be identified from a probability of a feature not failing due to manufacturing parameter variability, which can be found by integrating the two-dimensional probability density function for the manufacturing variability distribution $PDF_{2D}$ for ranges of manufacturing parameters—dose E and focus F—based on the process window 503 for the feature.

Referring to FIG. 3, the failure prediction system 330 can include a yield prediction unit 334 to determine a die yield metric for the integrated circuit capable of being manufactured by the mask design layout 301. The yield prediction unit 334 can utilize the feature failure rates for different types of structures and the frequency of those structures in the integrated circuit to determine the die yield metric. For example, the yield prediction unit 334 can determine the die yield metric utilizing a Poisson model shown in Equation 2:

$$DY = e^{-AD0} \quad (2)$$

In Equation 2, the die yield metric DY can be equal to an exponential function having exponents corresponding to a negative of a product of the die area A and a mean defect density $D_0$ for the integrated circuit. The mean defect density $D_0$ for the integrated circuit can be equal to a sum of defect densities for individual features in the integrated circuit. An individual feature defect density can be equal to a product of the feature failure rate determined by the feature failure unit 332 and a frequency of the feature in the integrated circuit.

The yield prediction unit 334 can determine a frequency of each feature to be fabricated in the integrated circuit, for example, by analyzing the mask design layout 301 or a target wafer image for the integrated circuit. The yield prediction unit 334 can utilize the frequency of each feature to be fabricated in the integrated circuit and the feature failure rates determined by the feature failure unit 332 to determine the die yield metric DY.

In some embodiments, the failure prediction system 330 can provide the failure presentation 305 to a design system or be implemented in the design system utilized to generate the mask design layout 301 or a layout design of the integrated circuit. The failure presentation 305 can include the feature failure rates and/or the die yield metric, which can inform the design system regarding potential impact of design features on the die yield or failure rates. The design system can utilize the feature failure rates and/or the die yield metric in the failure presentation 305 in the alteration of the layout design for the integrated circuit or the alteration of the mask design layout 301.

The OPC verification tool 300 can include a parameter setting system 340 to determine which values for the manufacturing parameters, such as dose and focus, the semiconductor manufacturer should set based on the die yield metric. In some embodiments, the parameter setting system 340 can determine die yield metrics for multiple different combinations of manufacturing parameter values and then select one of the manufacturing parameter value combinations for the semiconductor manufacturer to set for the fabrication process, for example, a manufacturing parameter value combination providing the highest die yield or the lowest chip failure rate. Embodiments of setting foundry values for the manufacturing parameters based on the die yield metric will be described below with reference to FIGS. 6A-6D.

Figures 6A, 6B, 6C, 6D:
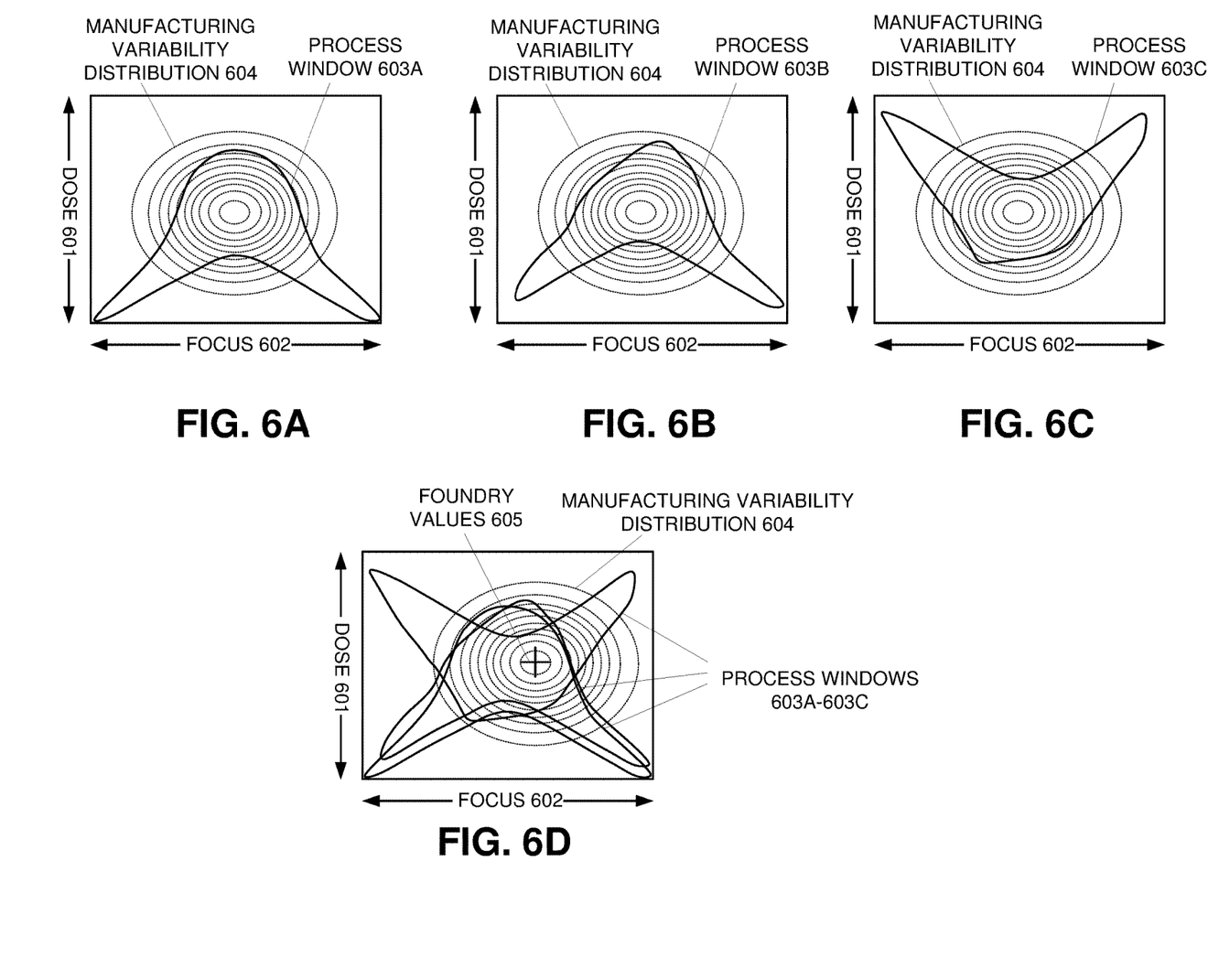
FIGS. 6A-6D illustrate example process windows for integrated circuit structures with a manufacturing variability distribution according to various examples.

Referring to FIGS. 6A-6C, the graphs show multiple process windows 603A-603C associated with different structures capable of being fabricated during a photolithographic process. The process windows 603A-603C can correspond to combinations of manufacturing parameters—close 601 and focus 602—that would allow a structure to be fabricated having a range of line widths considered to be non-defective based on a failure definition. The graphs also can include a manufacturing variability distribution 604, such as a probability density function, for the manufacturing parameters, which can be centered at set combination values of the dose 601 and focus 602.

Referring to FIG. 6D, the graph shows an overlapping combination of the process windows 603A-603C associated with the structures capable of being fabricated during a photolithographic process. The OPC verification tool can utilize the die yield metric generation technique to identify foundry values 605 corresponding to a set combination of dose 601 and focus 602 to be utilized during fabrication of the structures associated with the process windows 603A-603C. For example, the OPC verification tool can determine a die yield metric for multiple different combinations of dose 601 and focus 602 values used to center the manufacturing variability distribution 604. The combination of dose 601 and focus 602 corresponding to the highest yield or lowest failure rate of the multiple die yield metrics can be selected as the foundry values 605.

When the structures corresponding to the process windows 603A-603C occur at the same frequency in the integrated circuit, the foundry values 605 can be located towards the center of the overlapping portions of the process windows 603A-603C. When, however, the structures have an uneven distribution, the OPC verification tool can set the foundry values 605 to more heavily favor the more frequent structure. In the instant example, the foundry values 605 have their focus shifted to the right due to a higher frequency structure associated with process window 603B relative to structures associated with process windows 603A and 603C.

Referring back to FIG. 3, the values set by the parameter setting system 340 can be included in the failure presentation 305, which can be utilized by the semiconductor manufacturer to fabricate the integrated circuit using the mask design layout 301. In some embodiments, the failure presentation 305 can be utilized by an automated process control (APC) device during fabrication of the integrated circuit. The APC device can dynamically compensate for process drift during fabrication, for example, by adjusting an exposure dose. The APC device can receive the failure presentation 305 or include the parameter setting functionality to identify an adjustment to the dose or other manufacturing parameter that can be utilized to increase die yield.

The OPC verification tool 300 can include a failure tolerance system 350 to determine an error tolerance for the critical dimension based on the die yield metric determined by the yield prediction unit 334. In the determination of the die yield metric, the failure definition includes a critical dimension error tolerance to identify an amount of variance from the critical dimension the semiconductor manufacturer would allow and still consider a structure to be non-defective. Rather than have a static critical dimension error tolerance, the failure tolerance system 350 can vary the critical dimension error tolerance and determine multiple different die yield metrics for each of the critical dimension error tolerances. The failure tolerance system 350 can determine allowable variabilities of the manufacturing parameters, such as dose and focus, for each of the different critical dimension error tolerances based on the die yield metrics. The failure tolerance system 350 can include the critical dimension error tolerances and their associated allowance variabilities of the manufacturing parameters within the failure presentation 305, which can allow the semiconductor manufacturer to set the critical dimension error tolerance at least in part on how much those error tolerances would allow the manufacturing parameters to vary during fabrication.

Figure 7:
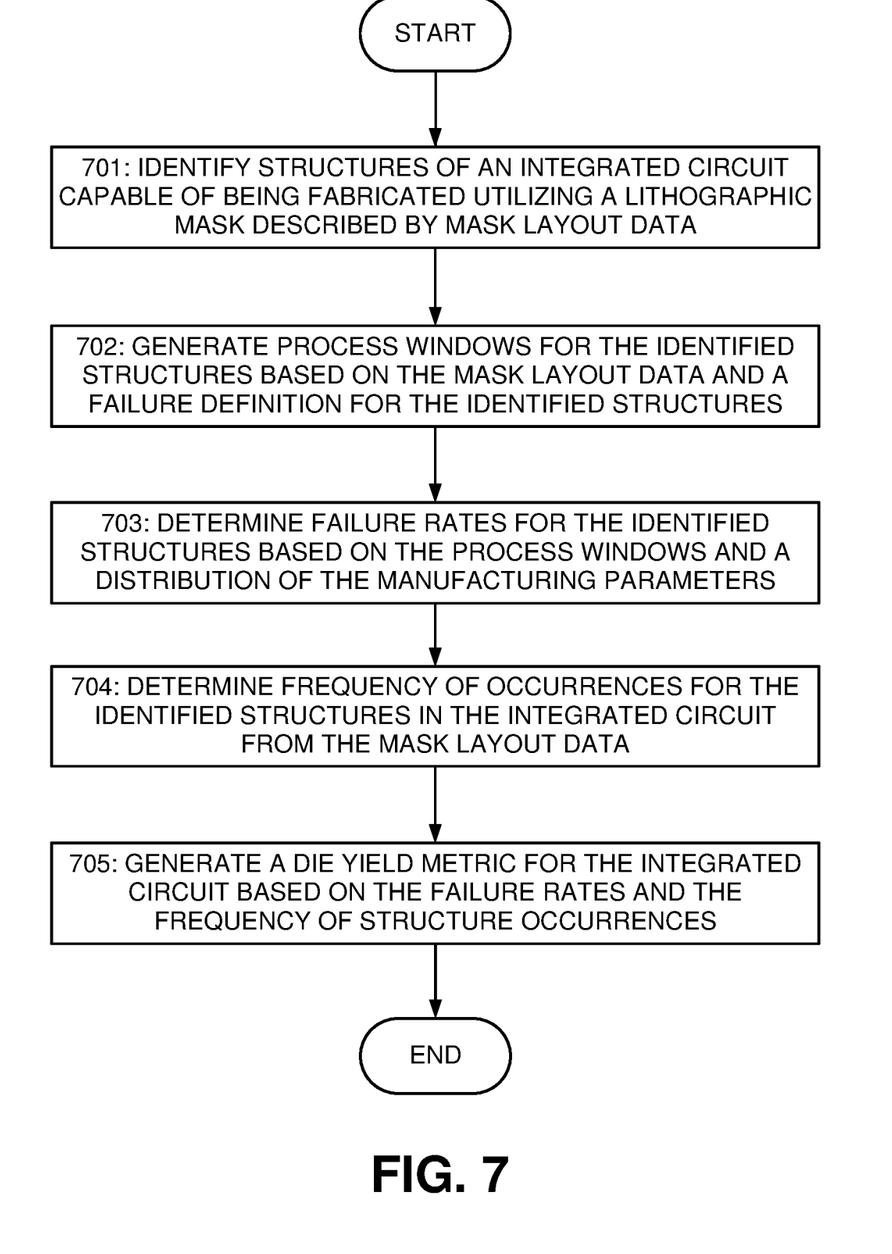
FIG. 7 illustrates a flowchart showing example a die yield assessment with an optical proximity correction (OPC) verification tool according to various examples.

FIG. 7 illustrates a flowchart showing example a die yield assessment with an optical proximity correction (OPC) verification tool according to various examples. Referring to FIG. 7, in a block 701, a computing system implementing an OPC verification tool can identify structures of an integrated circuit capable of being fabricated utilizing a lithographic mask described by mask layout data. The OPC verification tool can identify patterns in the mask layout data that, due to the variance of the manufacturing parameters during fabrication, have an increased risk of forming failing structures in an integrated circuit. These identified patterns in the mask layout data can correspond to candidate "hotspots" structures to investigate. In some embodiments, the OPC verification tool can simulate the fabrication of the integrated circuit based on the mask layout data to identify which of the patterns in the mask layout data correspond to the hotspot structures. The OPC verification tool also can perform pattern-matching operations on the mask layout data to identify candidate hotspots based on previously known hotspot patterns.

In a block 702, the computing system implementing the OPC verification tool can generate process windows for the identified structures based on the mask layout data and a failure definition for the identified structures. A process window can correspond to ranges of values for manufacturing parameters, such as dose and focus, which would allow the semiconductor manufacturer to fabricate non-failing structures with the pattern. In some embodiments, the OPC verification tool can simulate fabrication of structures associated with hotspot structures identified from the mask design layout, for example, utilizing different values of the manufacturing parameters. The OPC verification tool can identify those values of the manufacturing parameters that did not result in a structure failing based on a failure definition specifying an acceptable error tolerance for the manufacturing parameters relative to a critical dimension for the integrated circuit.

In a block 703, the computing system implementing the OPC verification tool can determine failure rates for the identified structures based on the process windows and a distribution of the manufacturing parameters. The OPC verification tool can generate a manufacturing variability distribution, such as a probability density function, for the manufacturing parameters based on the distribution of the manufacturing parameters. For example, when two manufacturing parameters—dose and focus—vary during fabrication of the integrated circuit, the OPC verification tool can generate a two-dimensional probability density function based on the distribution of the manufacturing parameters. In some embodiments, the distribution of the manufacturing parameters can include mean or average values and standard deviations for the manufacturing parameters. The OPC verification tool can determine the failure rates by applying the manufacturing variability distribution to the process windows for the identified structures, for example, integrating a probability density function over an area defined by the process windows for the identified structures.

In a block 704, the computing system implementing the OPC verification tool can determine frequency of occurrences for the identified structures in the integrated circuit. The OPC verification tool can determine a frequency of each structure to be fabricated in the integrated circuit, for example, by analyzing the mask layout data or a target wafer image for the integrated circuit. The frequency of each structure can correspond to a number of patterns the mask layout data that correspond to the structure per unit area of the integrated circuit, for example, specified as squared centimeters.

In a block 705, the computing system implementing the OPC verification tool can generate a die yield metric for the integrated circuit based on the failure rates and the frequency of occurrences for the identified structures. The OPC verification tool can utilize the failure rates for different types of structures and the frequency of those structures in the integrated circuit to determine the die yield metric. In some embodiments, the die yield metric can be equal to an exponential function having exponents corresponding to a negative of a product of the die area and a mean defect density for the integrated circuit. The mean defect density for the integrated circuit can be equal to a sum of defect densities for individual features in the integrated circuit. An individual feature defect density can be equal to a product of the feature failure rate and a frequency of the feature in the integrated circuit.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Conclusion

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   identifying, by a computing system, structures of an integrated circuit capable of being fabricated utilizing a lithographic mask described by mask layout data;
   determining, by the computing system, failure rates for the identified structures by:
      generating the process windows for the identified structures based, at least in part, on a lithographic response of the mask layout data and a failure definition for the integrated circuit, and
      integrating a distribution of manufacturing parameters during fabrication over the generated process windows for the identified structures;
   determining, by the computing system, frequency of occurrences for the identified structures in the integrated circuit from the mask layout data; and
   generating, by the computing system, a die yield metric for the integrated circuit based, at least in part, on the failure rates for the identified structures and frequency of occurrences for the identified structures in the integrated circuit.

2. The method of claim 1, further comprising applying, by the computing system, a probability density function corresponding to the distribution of the manufacturing parameters during fabrication to the process windows for the identified structures to generate the failure rates for the identified structures.

3. The method of claim 1, wherein generating the die yield metric for the integrated circuit further comprises aggregating the failure rates for the identified structures based, at least in part, on the frequency of occurrences for the identified structures in the integrated circuit.

4. The method of claim 1, further comprising setting, by the computing system, values for the manufacturing parameters for use during fabrication of the integrated circuit based, at least in part, on the die yield metric for the integrated circuit.

5. The method of claim 1, further comprising predicting, by the computing system, an error tolerance from a critical dimension for the structures in the integrated circuit based, at least in part, on the die yield metric.

6. The method of claim 1, wherein the manufacturing parameters correspond to a focus of light exposed through the lithographic mask onto the integrated circuit and an exposure dose for the light.

7. A system comprising:
   a memory device configured to store machine-readable instructions; and
   a computing system including one or more processing devices, in response to executing the machine-readable instructions, configured to:
      identify structures of an integrated circuit capable of being fabricated utilizing a lithographic mask described by mask layout data;
      determine failure rates for the identified structures by:
         generating the process windows for the identified structures based, at least in part, on a lithographic response of the mask layout data and a failure definition for the integrated circuit, and
         integrating a distribution of manufacturing parameters during fabrication over the generated process windows for the identified structures;
      determine frequency of occurrences for the identified structures in the integrated circuit from the mask layout data; and
      generate a die yield metric for the integrated circuit based, at least in part, on the failure rates for the identified structures and frequency of occurrences for the identified structures in the integrated circuit.

8. The system of claim 7, wherein the one or more processing devices, in response to executing the machine-readable instructions, are configured to apply a probability density function corresponding to the distribution of the manufacturing parameters during fabrication to the process windows for the identified structures to generate the failure rates for the identified structures.

9. The system of claim 7, wherein the one or more processing devices, in response to executing the machine-readable instructions, are configured to aggregate the failure rates for the identified structures based, at least in part, on the frequency of occurrences for the identified structures in the integrated circuit, which generates the die yield metric for the integrated circuit.

10. The system of claim 7, wherein the one or more processing devices, in response to executing the machine-readable instructions, are configured to set values for the manufacturing parameters for use during fabrication of the integrated circuit based, at least in part, on the die yield metric for the integrated circuit.

11. The system of claim 7, wherein the one or more processing devices, in response to executing the machine-readable instructions, are configured to predict an error tolerance from a critical dimension for the structures in the integrated circuit based, at least in part, on the die yield metric.

12. An apparatus including a memory device storing instructions configured to cause one or more processing devices to perform operations comprising:
   identifying structures of an integrated circuit capable of being fabricated utilizing a lithographic mask described by mask layout data;
   determining failure rates for the identified structures by:
      generating the process windows for the identified structures based, at least in part, on a lithographic response of the mask layout data and a failure definition for the integrated circuit, and integrating a distribution of manufacturing parameters during fabrication over the generated process windows for the identified structures;

determining frequency of occurrences for the identified structures in the integrated circuit from the mask layout data; and generating a die yield metric for the integrated circuit based, at least in part, on the failure rates for the identified structures and frequency of occurrences for the identified structures in the integrated circuit.

13. The apparatus of claim 12, wherein the instructions are configured to cause one or more processing devices to perform operations further comprising applying a probability density function corresponding to the distribution of the manufacturing parameters during fabrication to the process windows for the identified structures to generate the failure rates for the identified structures.

14. The apparatus of claim 12, wherein generating the die yield metric for the integrated circuit further comprises aggregating the failure rates for the identified structures based, at least in part, on the frequency of occurrences for the identified structures in the integrated circuit.

15. The apparatus of claim 12, wherein the instructions are configured to cause one or more processing devices to perform operations further comprising setting values for the manufacturing parameters for use during fabrication of the integrated circuit based, at least in part, on the die yield metric for the integrated circuit.

16. The apparatus of claim 12, wherein the instructions are configured to cause one or more processing devices to perform operations further comprising predicting an error tolerance from a critical dimension for the structures in the integrated circuit based, at least in part, on the die yield metric.

17. The apparatus of claim 12, wherein the manufacturing parameters correspond to a focus of light exposed through the lithographic mask onto the integrated circuit and an exposure dose for the light.

\* \* \* \* \*